United States Patent
Focke et al.

(10) Patent No.: US 7,216,755 B2
(45) Date of Patent: May 15, 2007

(54) DEVICE FOR PRODUCING CIGARETTE PACKAGES

(75) Inventors: Heinz Focke, deceased, late of Verden (DE); Doris Focke, legal representative, Verden (DE); Jürgen Focke, legal representative, Verden (DE); Hermann Blome, Blender-Einste (DE); Heido Spöring, Verden (DE); Jürgen Tempel, Verden (DE)

(73) Assignee: Focke & Co. (GmbH & Co., KG), Verden (DE)

( * ) Notice: Subject to any disclaimer, the term of this patent is extended or adjusted under 35 U.S.C. 154(b) by 63 days.

(21) Appl. No.: 10/540,031

(22) PCT Filed: Dec. 3, 2003

(86) PCT No.: PCT/EP03/13609

§ 371 (c)(1),
(2), (4) Date: Jun. 22, 2005

(87) PCT Pub. No.: WO2004/058570

PCT Pub. Date: Jul. 15, 2004

(65) Prior Publication Data

US 2006/0144018 A1   Jul. 6, 2006

(30) Foreign Application Priority Data

Dec. 23, 2002   (DE) ................. 102 61 526

(51) Int. Cl.
*B65G 47/30*   (2006.01)

(52) U.S. Cl. ............... 198/418.1; 131/283; 53/444

(58) Field of Classification Search ............. 198/418.1, 198/418.2, 418.3, 418.4, 429; 131/282, 283; 53/444, 449

See application file for complete search history.

(56) References Cited

U.S. PATENT DOCUMENTS

| | | | |
|---|---|---|---|
| 3,869,035 A | | 3/1975 | Focke |
| 4,488,632 A | * | 12/1984 | Focke et al. ............. 198/418.1 |
| 4,856,538 A | | 8/1989 | Focke et al. |
| 4,947,872 A | * | 8/1990 | Gamberini ................. 131/283 |
| 5,375,392 A | * | 12/1994 | Oberdorf ................. 198/418.1 |
| 5,548,941 A | * | 8/1996 | Portaro et al. ........... 198/418.1 |
| 5,617,943 A | * | 4/1997 | Belvederi et al. ........ 198/418.1 |
| 6,311,827 B1 | * | 11/2001 | Draghetti ................. 198/418.1 |
| 6,484,867 B2 | * | 11/2002 | Spatafora et al. ........ 198/418.1 |

FOREIGN PATENT DOCUMENTS

| | | |
|---|---|---|
| DE | 24 00 680 | 8/1974 |
| DE | 31 31 596 A1 | 2/1983 |
| DE | 31 16 156 C2 | 4/1983 |

(Continued)

*Primary Examiner*—James R. Bidwell
(74) *Attorney, Agent, or Firm*—Sughrue Mion, PLLC

(57) ABSTRACT

For the production of cigarette groups (11) having a formation comprising a plurality of vertical rows of cigarettes (10) arranged one beside the other, after pushing a corresponding number of cigarettes (10) out of shafts (13) of a cigarette magazine (12), a transverse displacement of the cigarettes (10) is required in order to arrange same in a tightly packed or saddle configuration. At least marginal push rods (18) for pushing the cigarettes (10) out of the shafts (13) of the cigarette magazine (12) can be displaced transversely together with the cigarettes.

16 Claims, 5 Drawing Sheets

FOREIGN PATENT DOCUMENTS

| | | |
|---|---|---|
| DE | 25 32 112 C2 | 7/1986 |
| DE | 42 05 879 C1 | 8/1993 |
| DE | 43 43 803 A1 | 6/1995 |
| GB | 1 010 218 | 11/1965 |
| GB | 2 099 783 | 12/1982 |
| GB | 2 104 035 A | 3/1983 |

* cited by examiner

DEVICE FOR PRODUCING CIGARETTE PACKAGES

BACKGROUND OF THE INVENTION

The invention relates to an apparatus for producing cigarette packs for a formed cigarette group which can be pushed out of a cigarette magazine containing vertical shafts for a respective row of stacked cigarettes, the cigarette group, subsequent to the magazine, being able to be transported via a conveying section or diverter for forming the cigarette group into a pocket of a cigarette conveyor.

In conventional cigarette packs, the cigarette group is formed in such a way that horizontal rows of the cigarettes, to be precise two or three rows, are formed. The invention is concerned with more complex formations of cigarettes within a cigarette group and with the production of such formations.

SUMMARY OF THE INVENTION

The object on which the invention is based is to design an apparatus for producing cigarette groups, in particular a cigarette magazine having guiding and conveying elements, in such a way that, during the removal of the cigarette group from the cigarette magazine and up to the point of transfer to an adjoining cigarette conveyor, the desired formation of the cigarettes is created automatically as a result of the transportation.

To achieve this object, the apparatus according to the invention is characterized in that at least some of the cigarettes, preferably arranged in vertical rows, and at least lateral push rods for pushing the cigarettes out of the cigarette magazine can be moved transversely in the region of the conveying section or diverter in order to produce the formation of the group with directly adjacent cigarettes.

The formation of the cigarette group is preferably such that a plurality of vertical rows are arranged beside one another, the rows having a different number of cigarettes, specifically comprising in particular two or three stacked cigarettes. The rows comprising two cigarettes here are to be positioned in a "saddle configuration", that is to say "in stagger", with respect to the cigarettes of the adjacent rows made up of three cigarettes.

The elongate push rods which enter each shaft of the cigarette magazine to push out the cigarettes are designed in a particular way. Owing to their size and relative position, the push rods cause either two or three stacked cigarettes to be pushed out. The diverter is designed in such a way that during the conveying movement a transverse displacement of the cigarettes occurs, thereby forming a closely packed (transverse) configuration, and in addition the cigarettes of the rows made up of two stacks of cigarettes are supported by lower and/or upper guiding elements, specifically guiding ribs. A completely formed cigarette group is accordingly transferred to the cigarette conveyor or to a pocket thereof.

BRIEF DESCRIPTION OF THE DRAWINGS

Further particular features of the invention are explained in more detail below with reference to the drawings, in which.

DETAILED DESCRIPTION OF THE INVENTION

When packing cigarettes 10—or comparable elongate objects—the cigarettes 10 fed in with parallel orientation, but without formation, are initially combined into specially formed cigarette groups 11. Such a cigarette group 11 then corresponds to the content of a cigarette pack.

Figure 1:
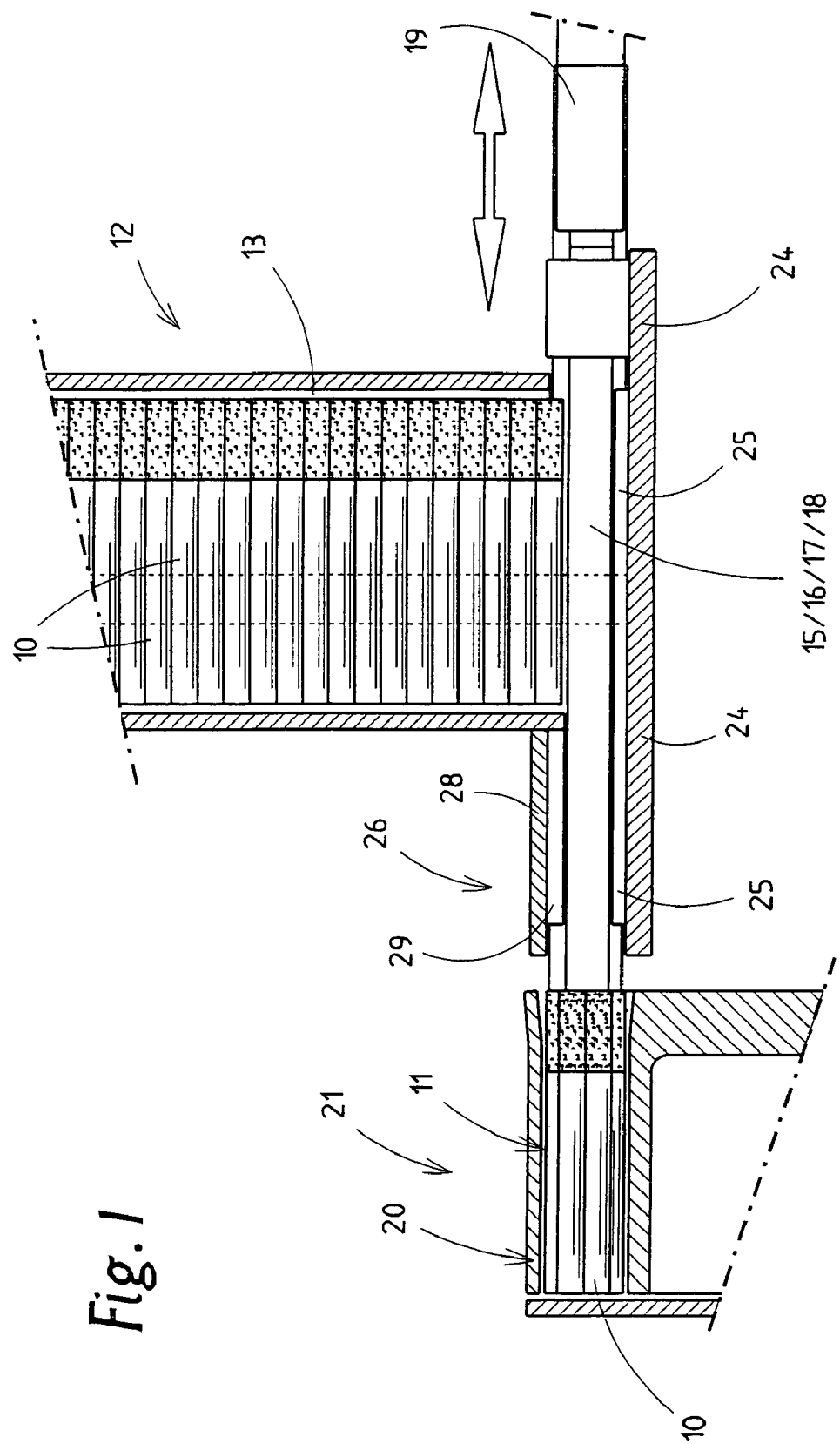
FIG. 1 shows a (lower) part of a cigarette magazine in vertical section.
Figure 5:
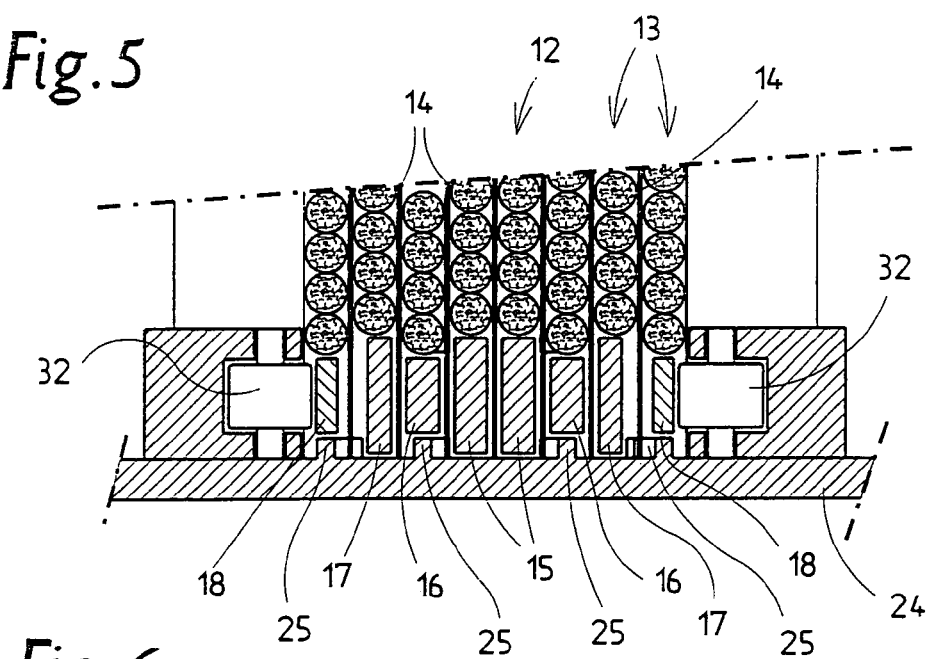
FIG. 5 shows a cross section in the region of the cigarette magazine corresponding to section plane V—V in FIG. 3.

To form the cigarette groups 11, the cigarettes 10 are introduced into a cigarette magazine 12 whose lower region comprises a plurality of vertical shafts 13 situated beside one another. These are delimited from one another by likewise vertical, thin shaft walls 14. Each shaft 13 contains a vertical row of cigarettes 10 arranged individually one above the other in a tightly packed configuration (FIG. 1, FIG. 5).

To form a cigarette group 11, a corresponding number of cigarettes 10 are pushed out of the shafts 13 at the lower end, to be precise at least one cigarette 10 from each shaft 13. In the present case, two or three cigarettes 10 at a time are pushed out of a shaft 13 to produce a specially formed cigarette group 11. The number of the shafts 13 belonging to a unit which are situated next to one another corresponds to the number of the rows of cigarettes 10 to be pushed out per operating cycle. Push rods 15, 16, 17, 18 are used to push a cigarette group 11 out of the cigarette magazine 12. These are elongate arms with a substantially rectangular cross-sectional profile which are mounted on one side on a common carrier 19. All of the push rods 15 . . . 18 are moved from an initial position on a rear side of the cigarette magazine 12 (on the right in FIG. 1 and FIG. 2) through the shafts 13 in the lower region thereof by displacement until they reach an end position (FIG. 1, FIG. 4) in which the cigarette group 11 formed has reached a transportation position, specifically a pocket 20 of a cigarette conveyor 21.

Figure 6:
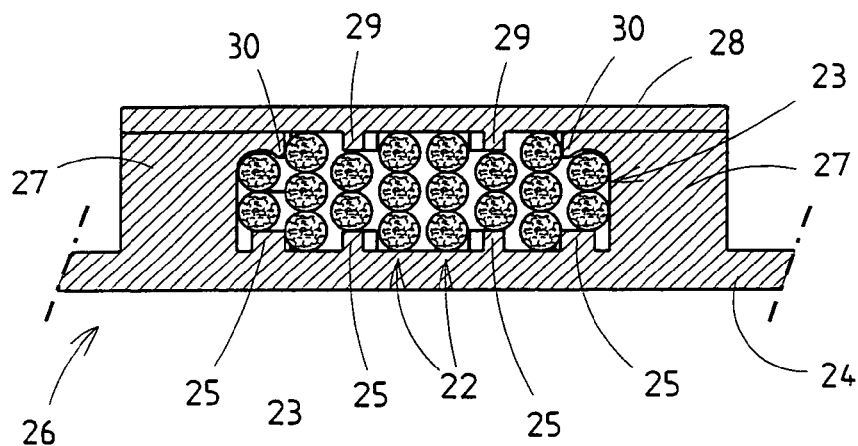
FIG. 6 shows a cross section in the region of a section plane VI—VI of FIG. 3.

The push rods 15 . . . 18 have different cross-sectional dimensions, specifically a different width and/or height. Two central push rods 15 are used to push out a respective row 22 made up of three stacked cigarettes. The push rods 15 have a transverse dimension which is slightly less than the internal space within a shaft 13. Adjacent thereto, two cigarettes 10, that is to say a row 23 made up of two stacked cigarettes 10, are to be pushed out by means of the correspondingly formed push rods 16. When being pushed out of the cigarette magazine 12, these cigarettes should be offset in terms of height with respect to the cigarettes 10 of the adjacent rows 22 (FIG. 6). The push rods 16 are smaller in height than the push rods 15 and are also positioned at a distance from a lower boundary or base plate 24.

Adjacent push rods 17 are comparable with the push rods 15 as regards their height. They are used to push out a row 22 containing three cigarettes 10. The push rods 17 have a narrower width and are arranged offset within the associated shafts 13, specifically being positioned in the shaft 13 on a side facing the adjacent push rods 16 (FIG. 5). This results in a gap being formed at the side facing the push rod 18.

The outer push rods 18 are used to push out rows 23 containing two cigarettes 10, are therefore correspondingly arranged and dimensioned, but with a narrower width, thus being of thin-walled design. The push rods 18 are positioned (in the initial position) centrally with respect to the associated shaft 13.

The formation of the cigarette group 11 is completed during the conveying movement of a cigarette group 11 from the cigarette magazine 12 to the cigarette conveyor 21. As can be seen in particular in FIG. 7, in the present exemplary embodiment the cigarette group 11 comprises eight vertical rows 22, 23, in each case made up of two or three stacked cigarettes 10. Rows 23 containing two cigarettes 10 are in each case provided on the outside. Two rows 22 containing cigarettes 10 situated beside one another at the same height are located in the center of the cigarette group 11. This formation of a cigarette group 11 is particularly suitable for cigarette packs of the type comprising a hinged-lid box with round side walls.

The offset (saddle configuration) of the cigarettes 10 in the rows 23 with respect to the rows 22 is predetermined in the region of the cigarette magazine 12. The respectively lower cigarettes 10 in selected shafts 13 are provided at the bottom end with spacers which support the lower cigarettes 10 of the rows 23 at an appropriate distance—approximately half a cigarette diameter—from the base plate 24. These spacers are ribs, to be precise bottom ribs 25, which extend along the base plate 24 approximately centrally within the shafts 13 associated with the rows 23. The push rods 16, 18 entering these shafts 13 are moved above the bottom ribs 25. The respectively lower cigarette 10 of the rows 23 rests on the associated bottom rib 25. The bottom ribs 25 acting as supporting element extend over the entire conveying section for the cigarettes 10, that is to say as far as the cigarette conveyor 21. The cigarettes 10 of the rows 22 rest—between the bottom ribs 25—directly on the base plate 24.

The cigarette magazine 12 is situated at a distance from the cigarette conveyor 21. Arranged in the region of this interspace is a shaped part 26, also referred to as a diverter, which brings the cigarettes 10, or the pushed-out cigarette group 11, into the end formation during the transporting movement. The shaped part 26 is mounted on the common base plate 24 and is designed essentially as a channel of closed cross section with side walls 27 and a covering wall 28. The rows 22 containing three cigarettes 10 arranged one above the other lie in an approximately fitting manner between the base plate 24 and covering wall 28. The cigarettes 10 of the rows 23 are also kept at a distance with respect to the covering wall 28, to be precise by means of upper ribs, specifically top ribs 29. The ribs 25, 29 simultaneously form lateral guides for the cigarettes 10 of the rows 22. The cigarettes 10 of the marginal rows 23 are provided, at least on the upper side, with a special guide, specifically with a guiding lug 30 which partially surrounds the upper contour of the upper cigarettes 10 in a form-fitting manner. This prevents cigarettes 10 of the adjacent rows 22, 23 interfering with one another during the transportation.

Figure 2:
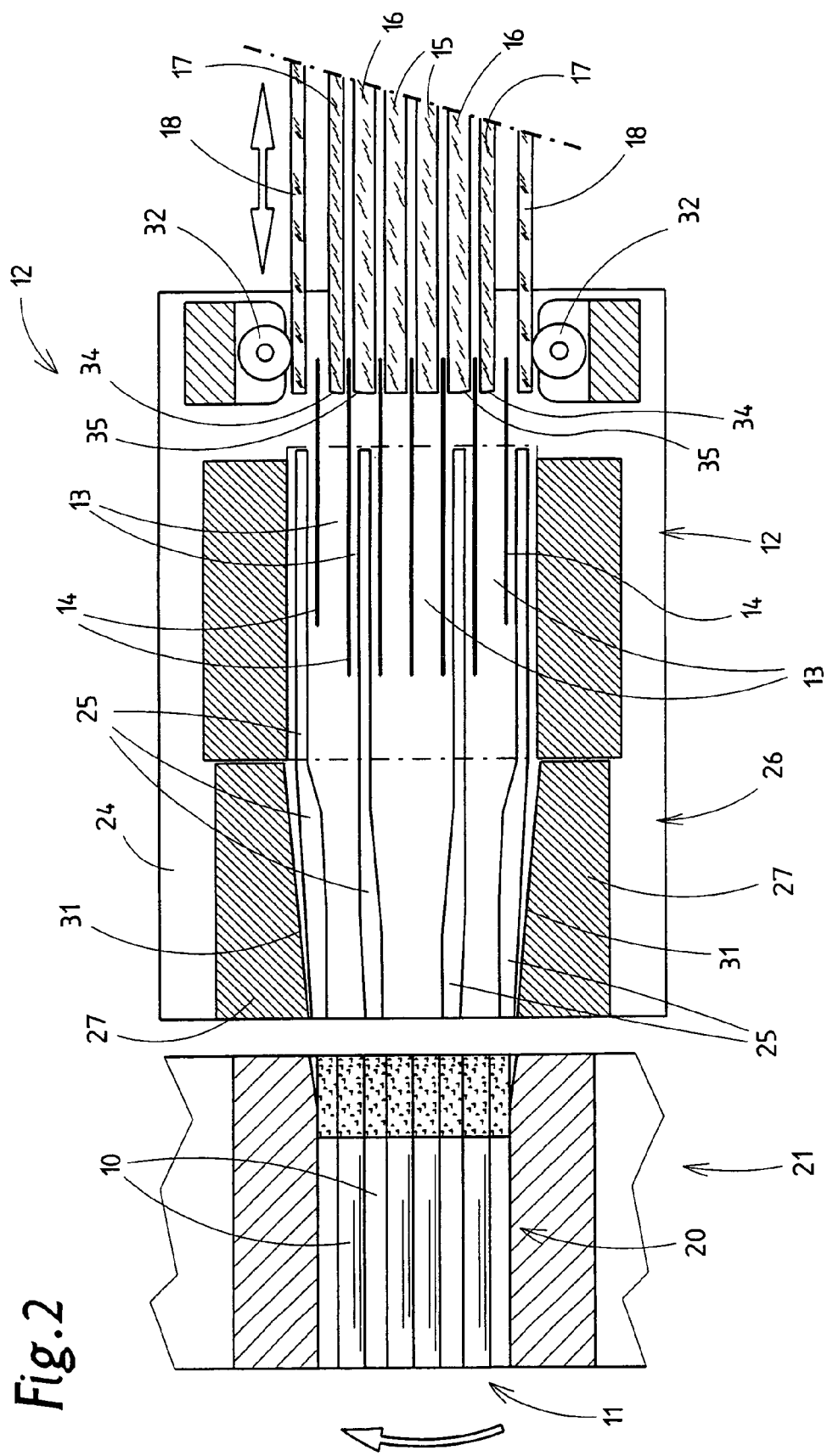
FIG. 2 shows the cigarette magazine according to FIG. 1 in the horizontal region in a lower section plane.
Figure 7:
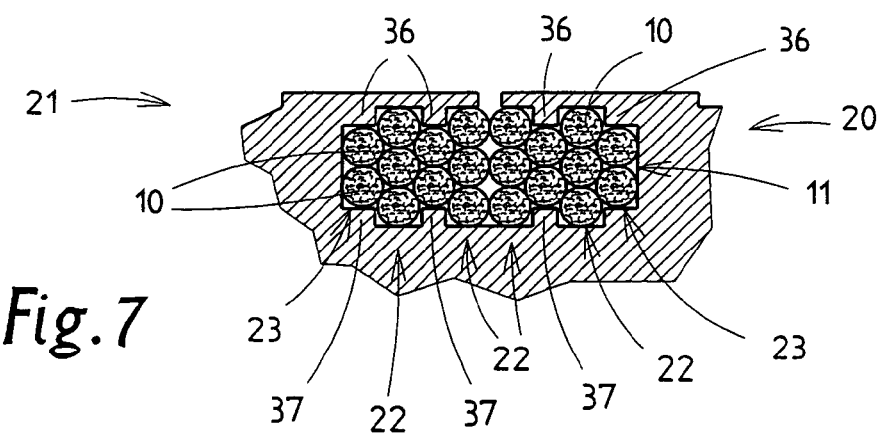
FIG. 7 shows a cross section in the region of a cigarette conveyor corresponding to section plane VII—VII of FIG. 4.

A particular feature involves the cigarettes 10, which are pushed out at a distance from one another owing to the configuration of the shafts 13 or because of the shaft walls 14, being pushed until they are in a tightly packed configuration against one another by transverse movement in the region of the shaped part 26 (FIG. 6, FIG. 7). This is achieved by the shaped part 26 having a funnel-shaped cross section which tapers in the direction of movement of the cigarettes 10, specifically by the side walls 27 with converging inner faces 31. The transverse displacement of the cigarettes 10 is accompanied by a corresponding transverse displacement of at least the marginal push rods 18. These are loaded in the transverse direction during the advancing movement, with the result that they follow the contour of the shaped part 26 and are moved inwardly, specifically being elastically deformed inwardly (FIG. 4) in order to allow problem-free deformation of these marginal push rods 18. Marginal shaft walls 14 are designed with a smaller dimension in the push-out direction of the cigarettes 10 (FIG. 2).

The guiding or supporting ribs, specifically the bottom ribs 24 and the top ribs 29, follow the transverse displacement of the marginal cigarettes 10, the ribs 25, 29 having a contour of varying width forming an upper or lower supporting surface for the cigarettes 10, with the result that the ribs 25, 29 provide optimum support during the transportation in the region of the shaped part 26 and with regard to the transverse movement.

Figure 4:
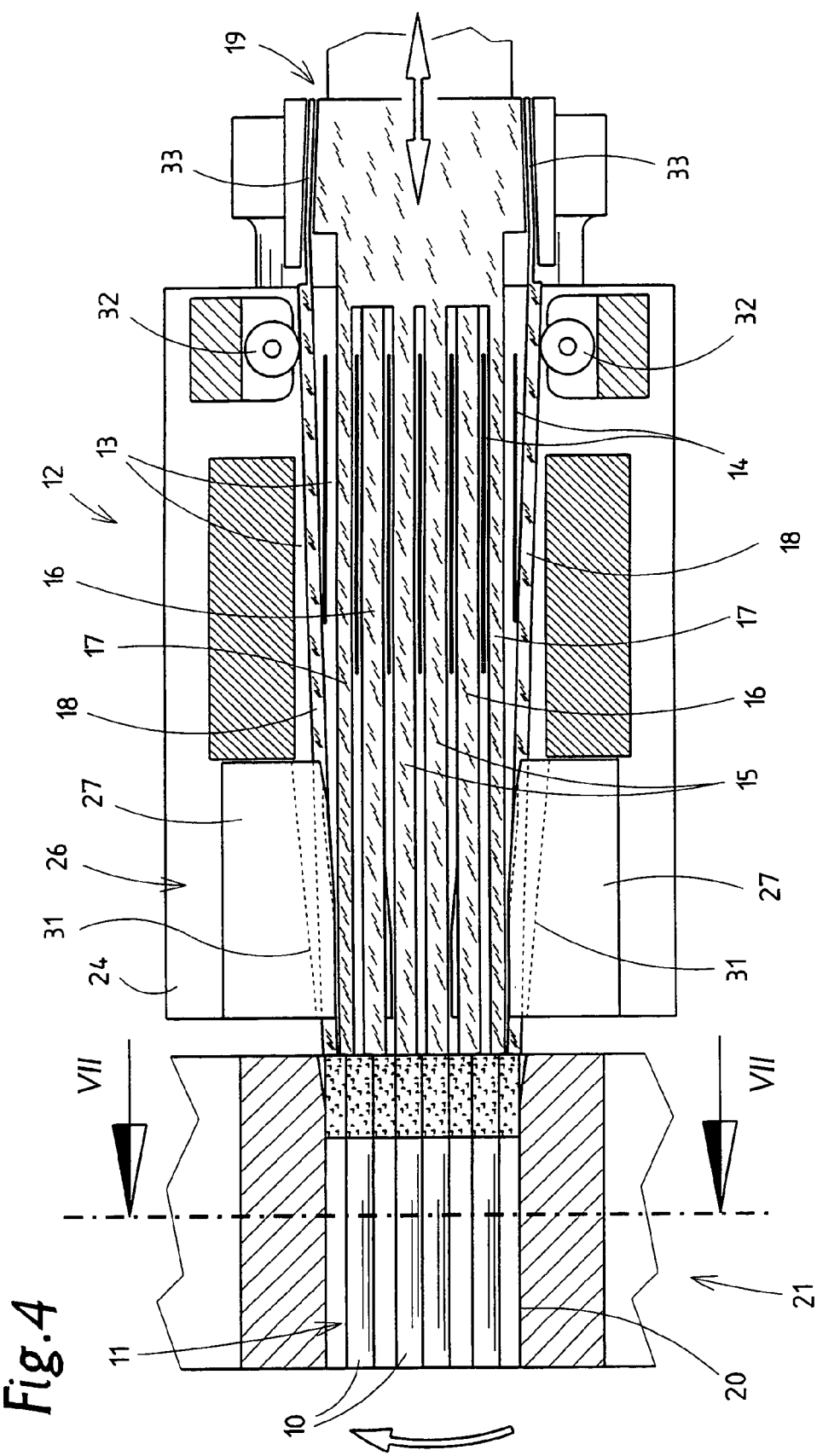
FIG. 4 shows a further representation corresponding to FIG. 3 with the position of the elements changed again.

The transverse movement or transverse deformation of the marginal push rods 18 during the pushing-out movement is brought about by means of positionally fixed guide elements against which the push rods 18 bear during the pushing-out movement. These are supporting rollers 32 which are each mounted laterally beside the path of movement of the push rods 18 with a vertical axis of rotation. The supporting rollers 32 bear against the outside of the push rods 18. The relative position of the supporting rollers 32 on the one hand and the shape and position of the push rods 18 on the other hand is chosen so that during the pushing-out movement a deformation of the push rods 18 and a transverse movement toward one another take place within the outer shafts 13. The push rods 18 may be completely (elastically) deformable. In the present exemplary embodiment, thin-walled end regions 33 of the push rods 18 are anchored in the block-shaped carrier 19 such that an elastic deformation of these end regions 33 can take place at the point where they emerge from the carrier 19, with the result that the push rods 18 are brought into an oblique position (FIG. 4). The end regions 33 are fixed in a slightly converging relative position in slots of the carrier 19. In addition, or as an alternative, front ends of the push rods 18 may be guided inwardly, with corresponding transverse displacement of the cigarettes 10 in question, by the converging inner faces 31 of the shaped part 26.

Figure 3:
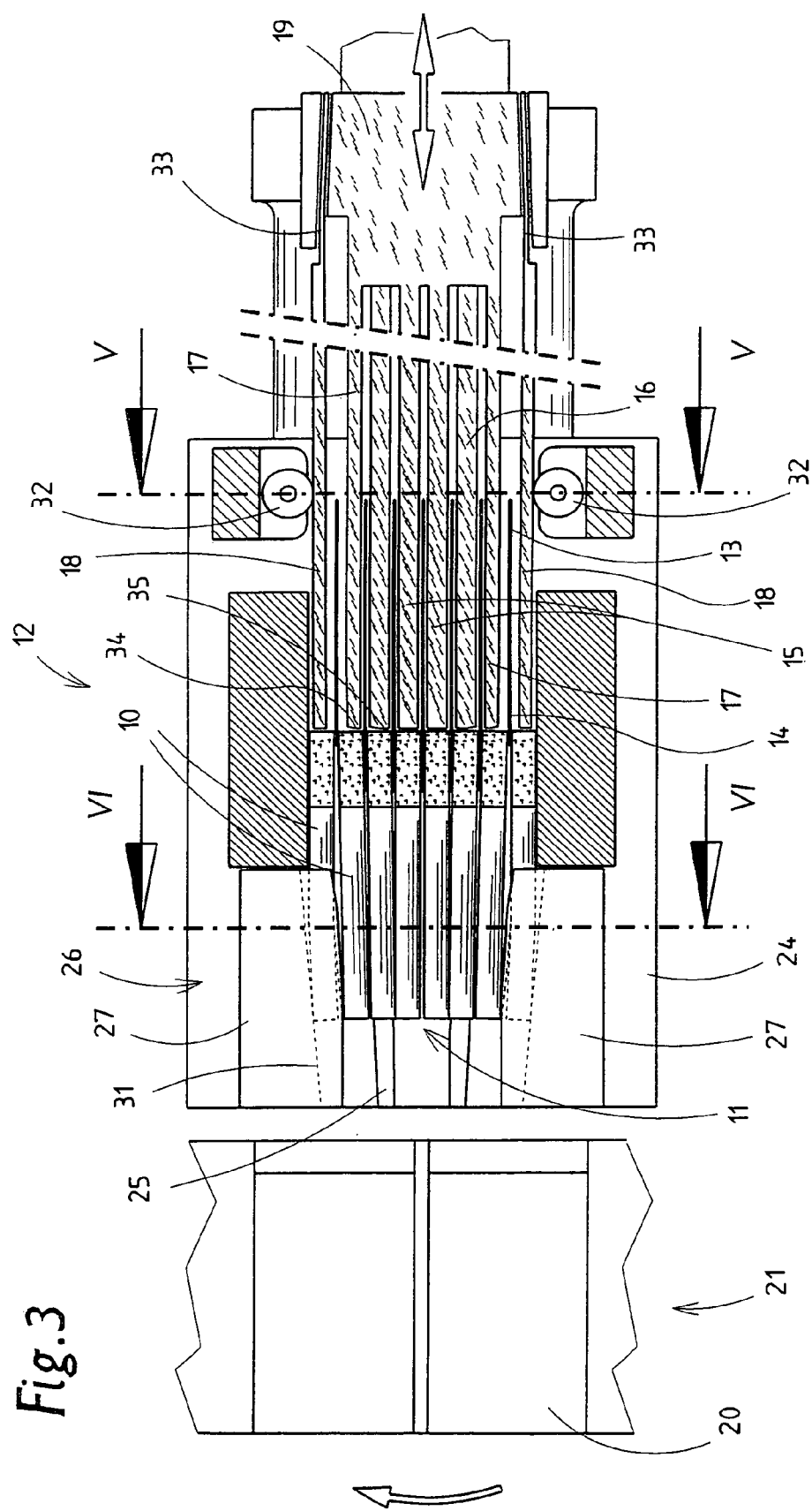
FIG. 3 shows a representation analogous to FIG. 2 with the position of the elements changed.

The cigarettes 10 in adjacent shafts 13, specifically cigarettes 10 associated with the push rods 16 and 17, are also displaced transversely by the shaped part 26 to form the tightly packed configuration. In order to facilitate the movement relative to the push rods 16, 17, the end faces 34, 35 thereof are beveled in the direction of displacement of the cigarettes 10 (FIG. 2 to FIG. 4).

The pocket 20 of the cigarette conveyor 21 is also matched to the particular formation of the cigarette group 11. At its upper and lower, or radially outer and inner, pocket walls, each pocket 20 has projections 36, 37 which enter cutouts or gaps formed by rows 23 containing a smaller number of cigarettes 10 (FIG. 7). The projections 36, 37 extend in a continuation of the bottom ribs 25 or top ribs 29, but based on the arrangement of the cigarettes 10 in the tightly packed configuration within the cigarette group 11.

LIST OF REFERENCES

10 cigarette
11 cigarette group
12 cigarette magazine
13 shaft
14 shaft wall 15 push rod
16 push rod
17 push rod
18 push rod
19 carrier
20 pocket
21 cigarette conveyor
22 row
23 row
24 base plate
25 bottom rib
26 shaped part
27 side wall
28 covering wall
29 top rib
30 guiding lug
31 inner face
32 supporting roller
33 end region
34 end face
35 end face
36 projection
37 projection

The invention claimed is:

1. An apparatus for producing cigarette packs for a formed cigarette group (11) which can be pushed out of a cigarette magazine (12) containing vertical shafts (13) for a respective row of stacked cigarettes (10), the cigarette group (11), subsequent to the shafts (13), being able to be transported along a conveying section containing a shaped part (26) for forming the cigarette group (11) and to be pushed into a pocket (20) of cigarette conveyor (21), characterized in that
at least some of the cigarettes (10), preferably arranged in vertical rows (22, 23) in the cigarette group (11), and at least lateral push rods (18) can be moved transversely in the region of the shaped part (26) in order to produce the formation of the cigarette group (11) with directly adjacent cigarettes (10), and
the arm-like push rods (15, 16, 17, 18) for each shaft (13) of the cigarette magazine (12) are designed with a different effective height for seizing different numbers of cigarettes (10) per shaft (13), in particular for seizing either two or three stacked cigarettes (10), push rods (16, 18) with a relatively small overall height for seizing, in particular, two cigarettes (10) being arranged at a distance from a lower push-out plane of the cigarette magazine (12), in particular at a distance from a base plate (24), in such a way that the pushed-out cigarettes (10) of the shaft (13) in question are offset in terms of height with respect to cigarettes (10) of adjacent shafts (13) during the pushing-out operation.

2. The apparatus as claimed in claim 1, characterized in that,
in order to determine different relative positions of cigarettes (10) in the adjacent shafts (13), at least individual shafts (13) have at their bottom end supporting elements which support the respectively lower cigarette (10) in a shaft (13) while fixing a relative position with respect to cigarettes (10) of adjacent shafts (13), the elevations or supporting elements being designed as ribs, specifically bottom ribs (25).

3. An apparatus for producing cigarette packs for a formed cigarette group (11) which can be pushed out of a cigarette magazine (12) containing vertical shafts (13) for a respective row of stacked cigarettes (10), the cigarette group (11), subsequent to the shafts (13), being able to be transported along a conveying section containing a shaped part (26) for forming the cigarette group (11) and to be pushed into a pocket (20) of a cigarette conveyor (21), characterized in that
at least some of the cigarettes (10), preferably arranged in vertical rows (22, 23) in the cigarette group (11), and at least lateral push rods (18) can be moved transversely in the region of the shaped part (26) in order to produce the formation of the group (11) with directly adjacent cigarettes (10).
in order to determine different relative positions of cigarettes (10) in the adjacent shafts (13), at least individual shafts (13) have at their bottom end supporting elements which support the respectively lower cigarette (10) in a shaft (13) while fixing a relative position with respect to cigarettes (10) of adjacent shafts (13), the elevations or supporting elements being designed as ribs, specifically bottom ribs (25), and
the ribs, specifically bottom ribs (25), extend in the region of the shaped part (26) subsequent to the cigarette magazine (12), preferably as an uninterrupted continuation of the bottom ribs (25) in the region of the shafts (13).

4. The apparatus as claimed in claim 1, characterized in that the shaped part (26) is designed as a channel of closed cross section, ribs being arranged in the region of the base plate (24) and a covering wall (28), specifically bottom ribs (24) and top ribs (29), in each case in the region of vertical rows (23) of cigarettes (10) with a smaller number of cigarettes (10).

5. An apparatus for producing cigarette packs for a formed cigarette group (11) which can be pushed out of a cigarette magazine (12) containing vertical shafts (13) for a respective row of stacked cigarettes (10), the cigarette group (11), subsequent to the shafts (13), being able to be transported along a conveying section containing a shaped part (26) for forming the cigarette group (11) and to be pushed into a pocket (20) of a cigarette conveyor (21),characterized in that
at least some of the cigarettes (10), preferably arranged in vertical rows (22, 23) in the cigarette group (11), and at least lateral push rods (18) can be moved transversely in the region of the shaped part (26) in order to produce the formation of the cigarette group (11) with directly adjacent cigarettes (10).
in order to determine different relative positions of cigarettes (10) in the adjacent shafts (13), at least individual shafts (13) have at their bottom end supporting elements which support the respectively lower cigarette (10) in a shaft (13) while fixing a relative position with respect to cigarettes (10) of adjacent shafts (13), the elevations or supporting elements being designed as ribs, specifically bottom ribs (25), and
the ribs-bottom ribs (25), top ribs (29)— in the region of the shaped part (26) follow the-transversely directed-displacement of the associated cigarettes (10) or rows (22, 23), in particular as a result of the converging course of the ribs.

6. An apparatus for producing cigarette packs for a formed cigarette group (11) which can be pushed out of a cigarette magazine (12) containing vertical shafts (13) for a respective row of stacked cigarettes (10), the cigarette group (11), subsequent to the shafts (13), being able to be transported along a conveying section containing a shaped part (26) for forming the cigarette group (11) and to be pushed into a pocket (20) of a cigarette conveyor (21), characterized in that at least some of the cigarettes (10), preferably arranged in vertical rows (22, 23) in the cigarette group (11), and at least lateral push rods (18) can be moved transversely in the region of the shaped part (26) in order to produce the formation of the cigarette group (11) with directly adjacent cigarettes (10).

in order to form a cigarette group (11), the cigarettes (10) can be displaced in the transverse direction after exiting the cigarette magazine (12) in order to position the cigarettes (10) in a tightly packed configuration, at least marginal push rots (18) being able to move transversely, preferably with elastic deformation, with the associated cigarettes (10) in the region of the shaped part (26), and the at least marginal push rods (18) bear against a supporting or guiding element, in particular against a supporting roller (32) outside the region of the cigarette magazine (12), it being possible, owing to the relative position of the supporting roller (32) on the one hand and the shape and position of the push rods (18) on the other hand, for said push rods to be moved transversely in the region of the shaped part (26) by elastic deformation as a result of bearing against the supporting roller (32).

7. An apparatus for producing cigarette packs for a formed cigarette group (11) which can be pushed out of a cigarette magazine (12) containing vertical shafts (13) for a respective row of stacked cigarettes (10), the cigarette group (11), subsequent to the shafts (13), being able to be transported along a conveying section containing a shaped part (26) for forming the cigarette group (11) and to be pushed into a pocket (20) of a cigarette conveyor (21), characterized in that at least some of the cigarettes (10), preferably arranged in vertical rows (22, 23) in the cigarette group (11), and at least lateral push rods (18) can be moved transversely in the region of the shaped part (26) in order to produce the formation of the cigarette group (11) with directly adjacent cigarettes (10).

in order to determine different relative positions of cigarettes (10) in the adjacent shafts (13), at least individual shafts (13) have at their bottom end supporting elements which support the respectively lower cigarette (10) in a shaft (13) while fixing a relative position with respect to cigarettes (10) of adjacent shafts (13), the elevations or supporting elements being designed as ribs, specifically bottom ribs (25), and pockets (20) of a cigarette conveyor (21) adjoining the cigarette magazine (12) or the shaped part (26) have rib-like projections (36, 37) in a continuation or extension of the bottom ribs (25) and top ribs (29).

8. An apparatus for forming cigarette groups (11) that can be pushed by push rods (18) out of a cigarette magazine (12) with adjacently disposed upright shafts (13) for a respective row of cigarettes (10) lying one above the other, said apparatus being adapted to transport the cigarette groups (11), after they have exited the cigarette magazine (12), along a conveying section containing a funnel-shaped part (26) having converging side walls (27) for the purpose of shifting cigarettes (10) within the cigarette group (11) in a transverse direction and to insert said cigarette groups (11) into a pocket (20) of a cigarette conveyor (21), characterized by the following features:

a) rows (23) at the margins of the cigarette group (11) comprise in each case at least two cigarettes arranged one above the other, b) rows (22) adjacent to the marginal rows (23) comprise at least three cigarettes (10) arranged one above the other, c) the cigarettes (10) of the marginal rows (23) are offset in terms of height with respect to cigarettes (10) of the adjacent rows (22), and d) at least one push rod (18), assigned to the marginal row (23) of cigarettes (10), IS nsversely movable with elastic deformation in a region of the funnel-shaped part (26), corresponding to a transverse displacement of an associated row (23) of cigarettes (10) during a conveying movement in a region of the funnel-shaped part (26).

9. The apparatus according to claim 8, characterized in that the arm-like push rods (15, 16, 17, 18) for each shaft (13) of the cigarette magazine (12) are designed with a different effective height for seizing different numbers of cigarettes (10) per shaft (13), in particular for seizing alternatively either two or three stacked cigarettes (10), push rods (16, 18) with a relatively small overall height for seizing, in particular, two cigarettes (10) being arranged at a distance from a lower push-out plane of the cigarette magazine (12), in particular at a distance from a base plate (24), in such a way that the pushed-out cigarettes (10) of the shaft (13) in question are offset in terms of height with respect to cigarettes (10) of adjacent shafts (13) during the pushing-out operation.

10. The apparatus according to claim 8, characterized in that, in order to determine different relative positions of cigarettes (10) in adjacent shafts (13), at least individual shafts (13) have at their bottom end supporting elements, namely bottom ribs (25), which support the respectively lower cigarette (10) in a shaft (13) while fixing a relative position with respect to cigarettes (10) of adjacent shafts (13).

11. The apparatus according to claim 10, characterized in that the bottom ribs (25) extend in the region of the shaped part (26) subsequent to the cigarette magazine (12), preferably as an uninterrupted continuation of the bottom ribs (25) in the region of the shafts (13).

12. The apparatus according to claim 8, characterized in that the shaped part (26) is designed as a channel of closed cross section, the ribs being arranged at the base plate (24) as well as at a covering wall (28) of the shaped part (26), namely bottom ribs (25) and top ribs (29), in each case in the region of vertical rows (23) of cigarettes (10) with a smaller number of cigarettes (10) as adjacent rows (22).

13. The apparatus according to claim 12, characterized in that the bottom ribs (25) and the top ribs (29) in the region of the shaped part (26) follow the transversely-directed displacement of the associated cigarettes (10) or rows (22, 23), in particular as a result of the converging course of the ribs (25, 29).

14. The apparatus according to claim 8, characterized in that at least marginal push rods (18) bear against a supporting or guiding element, in particular against a supporting roller (32) outside the region of the cigarette magazine (12), it being possible, owing to the relative position of the supporting roller (32) on the one hand and the shape and position of the push rods (18) on the other hand, for said push rods to be moved transversely in the region of the shaped part (26) by elastic deformation as a result of bearing against the supporting rollers (32).

15. The apparatus according to claim 8, characterized in that cigarettes (10) of marginal rows (22, 23) can be moved transversely relative to the associated push rods (16, 17), and end faces (34, 35) of the push rods (16, 17) are directed obliquely corresponding to the transverse movement of the cigarettes (10).

16. The apparatus according to claim 12, characterized in that pockets (20) of a cigarette conveyor (21) adjoining the cigarette magazine (12) or the shaped part (26) have rib-like projections (36, 37) in a continuation or extension of the bottom ribs (25) and top ribs (29).

* * * * *